United States Patent [19]

Hall

[11] 4,383,668
[45] May 17, 1983

[54] CABLE CLAMP

[76] Inventor: Gaddis G. Hall, P.O. Box 6699, Birmingham, Ala. 35210

[21] Appl. No.: 270,255

[22] Filed: Jun. 4, 1981

[51] Int. Cl.³ .............................................. F16L 3/00
[52] U.S. Cl. .................................... 248/63; 24/135 L; 174/42; 339/265 R
[58] Field of Search ............ 248/63, 64, 74 R, 316 D, 248/544; 24/135 L, 136 B, 135 R, 135 N, 263 A; 174/94 S, 40 R, 42; 339/265 R, 265 F; 403/373, 188, 346, 347

[56] References Cited

U.S. PATENT DOCUMENTS

| | | | |
|---|---|---|---|
| 1,693,440 | 11/1928 | Hawley | 24/135 L |
| 2,028,931 | 1/1936 | Taylor | 248/63 |
| 2,041,613 | 5/1936 | Lincks | 248/63 |
| 2,077,783 | 4/1937 | Taylor | 248/63 |
| 2,338,658 | 1/1944 | Morehouse | 248/544 |
| 2,884,476 | 4/1959 | Lock et al. | 174/42 |
| 2,946,108 | 7/1960 | Bethea | 24/135 L |
| 3,470,528 | 9/1969 | Farrington et al. | 339/265 R |

FOREIGN PATENT DOCUMENTS 664214  6/1963  Canada ............................ 248/74 R Primary Examiner—William H. Schultz
Assistant Examiner—Ramon O. Ramirez
Attorney, Agent, or Firm—Woodford R. Thompson, Jr.

[57] ABSTRACT

A cable clamp embodies a body having a cable receiving groove therein and a keeper mounted for movement to selected positions over the cable receiving groove. A resilient member between the body and the keeper urges the keeper to a position which permits a cable to be inserted or removed. Clamping members are carried by the body in parallel relation to the groove, with one clamping member being connected to the body in a manner which permits it to be tilted and moved selectively to a released position and a connected position relative to side portions of the keeper adjacent thereto.

2 Claims, 5 Drawing Figures

CABLE CLAMP

BACKGROUND OF THE INVENTION

This invention relates to a clamp for a cable, such as an electrical conductor, and more particularly to such a cable clamp which has improved means for positively securing a dead end of an energized electrical conductor within the clamp.

Heretofore in the art to which my invention relates various devices have been devised for connecting a dead end of an electrical conductor to a supporting structure. Conventional dead end connectors with which I am familiar are illustrated in the following U.S. Pat. Nos.: 2,884,476, 2,946,108 and 3,108,344. Difficulties have been encountered with conventional clamps due to the excessive installation time and effort required to connect an energized cable in the connector, thus increasing labor costs. Also, such conventional clamps frequently require more than one lineman on some occasions to use two conventional hot sticks to insert and clamp the conductor in place. Because of the frequent use of two hot sticks the possibility of electrical shock to the workman is increased, thus creating unsafe working conditions.

SUMMARY OF THE INVENTION

In accordance with my present invention, I overcome the above and other difficulties by providing an improved cable clamp which is simple of construction, economical of manufacture and requires a minimum of effort for installation in a quick and easy manner. Also, an energized conductor may be installed in my improved clamp with a single insulated tool whereby the possibility of electrical shock to a lineman is reduced. Furthermore, my improved clamp provides a total gripping strength which exceeds the breaking strength of the conductor on most conductor sizes.

My improved cable clamp embodies an elongated body having a cable receiving groove therein and a clevis at one end thereof adapted for pivotal connection to a supporting structure and a pulling eye laterally of the other end thereof. A keeper is mounted for movement to selected vertical positions relative to the cable receiving groove. A resilient member is interposed between the body and the keeper and urges the keeper to a vertical open position which permits a cable to be inserted without interference. A pair of spaced apart clamping members are carried by the body in parallel relation to the groove and remain parallel in all positions and are disposed to engage opposite sides of the keeper to urge it toward a closed cable gripping position.

BRIEF DESCRIPTION OF THE DRAWING

Apparatus embodying features of my invention is illustrated in the accompanying drawing, forming a part of this application, in which.

DETAILED DESCRIPTION

Figure 1:
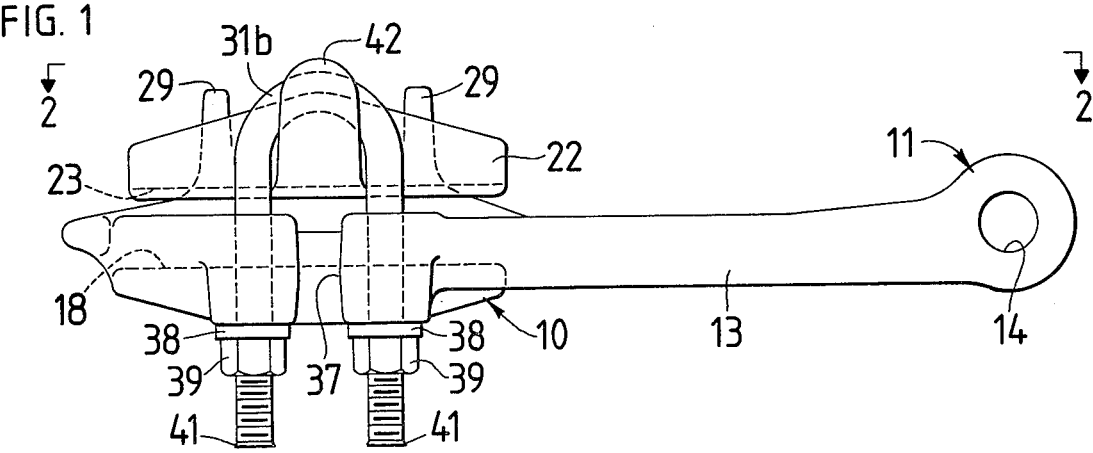
FIG. 1 is a side elevational view showing my improved cable clamp.
Figure 2:
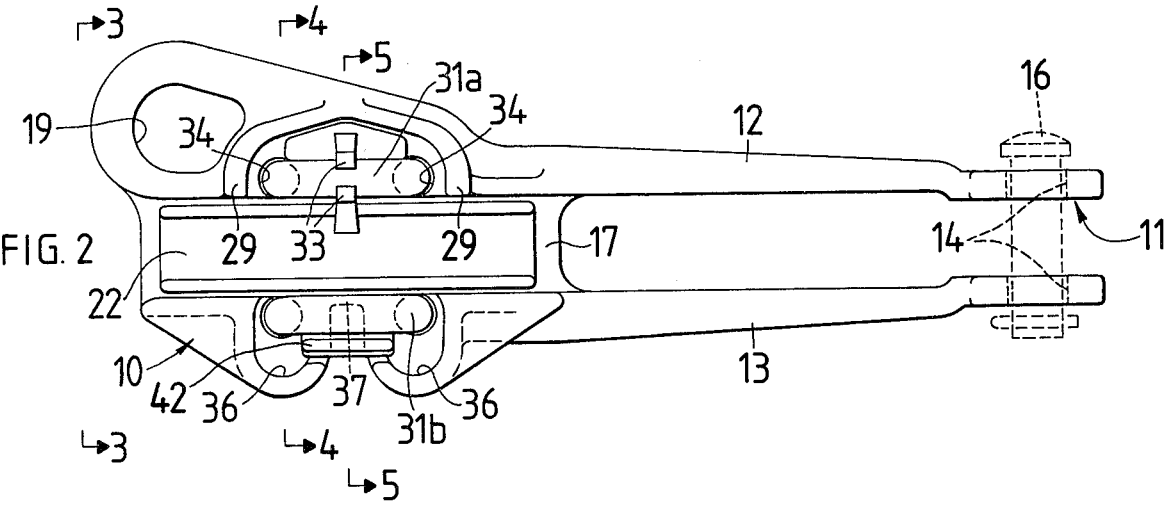
FIG. 2 is a top plan view taken generally along the line 2—2 of FIG. 1.

Referring now to the drawing for a better understanding of my invention, I show in FIGS. 1 and 2 an elongated body member 10 having a clevis 11 at one end thereof adapted for pivotal connection to a suitable supporting structure, not shown. The clevis 11 is provided with two arms 12 and 13 carried by one end of the body 10. An opening 14 is formed in each of the arms 12 and 13 in position ato receive a pin-like member 16, as shown. The center line of the maximum size cable passes through the center line of the clevis pin 16, resulting in the cable thrusting the body 10 and enhancing the holding power of the clamp.

A cable receiving groove 17 having a seat portion 18 is provided in the body 10. A laterally projecting pulling eye 19 is carried by the body 10 adjacent the end thereof opposite the clevis 11, as shown. The pulling eye 19 is adapted to receive a conventional type tensioning device, such as a comealong or coffin hoist, whereby tension may be applied to a cable 21, such as an electrical conductor. Preferably, the pulling eye is located on the right-hand side of the body 10 when looking at the clamp from the clevis end. The right hand side location gives the body 10 added strength since a conductor tends to rotate toward that side when being tensioned.

A keeper 22 having oppositely disposed side portions is adapted for movement in a direction perpendicular to the cable receiving groove 17, as shown. The keeper 22 has a concavely curved generally straight line contact surface 23 adapted to engage the opposite side of the cable 21 from the side thereof engaged by the seat portion 18. Also, the keeper 22 is adapted for movement selectively to an open position spaced from the groove 17 as shown in dotted lines in FIG. 4 and to a closed position with the straight line contact surface 23 engaging the cable 21 as shown in solid lines in FIG. 4. The keeper 22 is of a sufficient length to provide optimum gripping pressure which in turn is distributed along the length of contact with the cable 21.

A resilient member, such as a compression spring 24 is interposed between one side of the body 10 and the keeper 22 adjacent the groove 17, as shown. The spring 24 urges the keeper 22 toward the open position shown in FIG. 4. A recess 26 having an upwardly extending projection 27 is provided in the body 10 adjacent the groove 17 to receive the lower end of the spring 24, as shown. A downwardly extending recess 28 in the keeper 22 is vertically aligned over the recess 26 to receive the upper end of the spring 24. A pair of spaced apart upwardly extending guide members 29 are carried by the body 10 in position to guide and maintain the keeper 22 in vertical alignment as it moves to and from the open position. Also, a suitable lifting eye, not shown, may be carried by the keeper 22, for moving the keeper to selected vertical positions.

A pair of spaced apart clamping members, such as U-bolts 31a and 31b, are carried by the body 10 in parallel relation to the cable receiving groove 17, as shown. The U-bolts 31a and 31b are disposed to engage oppositely disposed side portions of the keeper 22 and move it toward its closed cable gripping position shown in FIGS. 3, 4 and 5. That is, a groove 32 is carried by each side portion of the keeper 22 to receive the base portion of its U-bolts. With the base portion of the U-bolts seated in their cooperating grooves 32, the keeper 22 is adapted to be moved to its closed cable gripping position. Suitable ear-like members 33 are carried by the keeper 22 in position to engage the U-bolt 31a, as shown in FIG. 2. The members 33 thus connect the U-bolt 31a to the keeper and prevent separation thereof. The single U-bolt 31a provides adequate holding power for the cable 21 and meets the required holding strength of the cable required of most users. The holding power of the U-bolt 31b adds to and often exceeds the rated breaking strength of the cable.

Figures 4, 5:
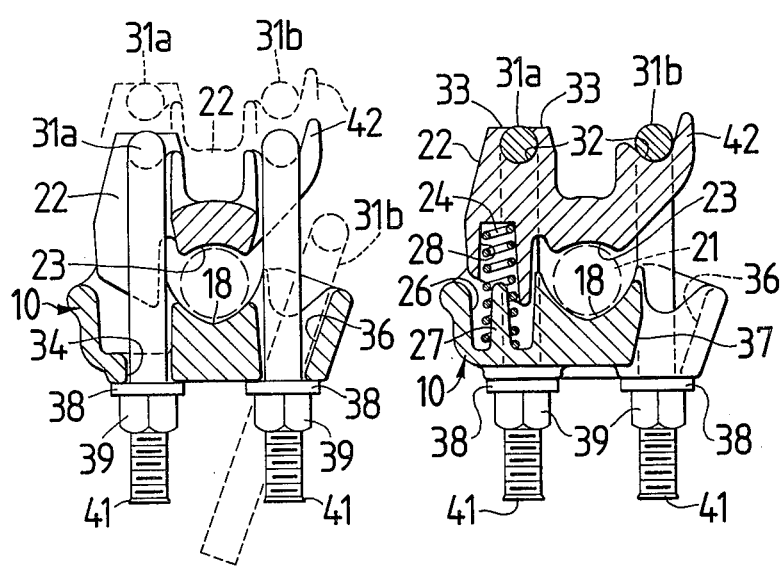
FIG. 4 is a sectional view taken generally along the line 4—4 of FIG. 2.
FIG. 5 is a sectional view taken generally along the line 5—5 of FIG. 2.

FIGS. 2 and 4 show a pair of vertical openings 34 extending through the body 10 adjacent the cable receiving groove 17. The openings 34 are in position to receive the legs of the U-bolts 31a. A pair of downwardly and inwardly extending openings 36 are provided in the body 10 in position to receive the legs of the U-bolt 31b, as shown. That is, the outermost sides of the openings 36 extend downwardly and inwardly, as shown in FIG. 4, to provide sufficient clearance to permit the U-bolt 31b to be tilted and moved upward into engagement with its cooperating groove 32. That is, the openings 36 provide a loose fit which allows the U-bolt 31b to move selectively to a lower released position out of engagement with the keeper 22, as shown in dotted lines in FIG. 4 and to a connected position seated in its cooperating groove 32. A slot 37 is provided in the body 10 between the openings 36, as shown in FIG. 2. The slot 37 provides clearance for a suitable tool, such as an insulated hot stick, which is used to engage and move the U-bolt 31b upwardly from its released position to its connected position. The U-bolt 31b may also be moved to selected positions by a socket wrench carried by the insulated hot stick.

Extra thick washers 38 are interposed between the body 10 and nuts 39 carried by threaded ends of each U-bolt 31a and 31b, as shown. By using extra heavy washers 38, I eliminate dishing of the washers into the openings 34 and 36. Also, the ends of each U-bolt are slightly deformed or peened, as at 41, to prevent accidental removal of the nuts 39.

Figure 3:
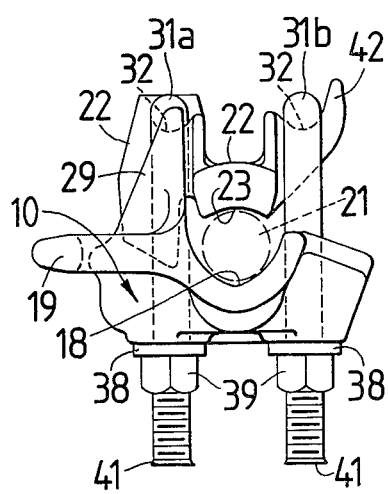
FIG. 3 is an end view taken generally along the line 3—3 of FIG. 2.

An upwardly extending element 42 is carried by the keeper 22 above the opening 36, as shown in FIGS. 3, 4 and 5. The element 42 retains the U-bolt 31b in its cooperating groove 32 as the keeper 22 moves to and from its closed cable gripping position.

From the foregoing description, the operation of my improved cable clamp will be readily understood. With the clamp pivotally connected to a suitable supporting structure, not shown, and the keeper 22 in its closed cable gripping position relative to the dead end of a cable 21, the nuts 39 of the U-bolt 31b are rotated in a direction to permit movement of the U-bolt 31b to its released position out of engagement with the keeper 22. That is, the U-bolt 31b is removed from its groove 32 and upwardly and outwardly over the element 42 by a suitable insulated tool, such as a hot stick or by an insulated socket wrench engaging the nuts 39. The U-bolt 31b is then lowered to the released position shown in dotted lines in FIG. 4.

Upon loosening the nuts 39 carried by the U-bolt 31a the keeper 22 is then urged upwardly by the spring 24 toward its open position, as shown in FIG. 4, whereby the cable 21 may be removed or inserted. After insertion of a cable into the groove 17 the nuts 39 of the U-bolt 31a are tightened to thus compress the spring 24 and move the keeper 22 to the closed position. The U-bolt 31b is then moved upwardly by the insulated tool over the element 42 and into its groove 32 whereupon its nuts 39 are then tightened.

From the foregoing, it will be seen that I have devised an improved cable clamp which is simple of construction, economical of manufacture and one which may be installed quickly, safer and easily with a minimum of effort. Also, my improved clamp reduces the possibility of electrical shock to workmen and provides a total gripping strength which exceeds the breaking strength of most conductor sizes.

While I have shown my invention in but one form, it will be obvious to those skilled in the art that it is not so limited, but is susceptible of various changes and modifications without departing from the spirit thereof.

What I claim is:

1. In a cable clamp having a body with a cable receiving groove therein and a clevis at one end thereof for pivotal connection to a supporting structure and a pulling eye at the other end thereof,
   (a) a keeper having oppositely disposed laterally extending side portions mounted for movement in a direction substantially perpendicular to said cable receiving groove selectively to an open position spaced from said cable receiving groove and to a closed position engaging a cable in said cable receiving groove,
   (b) a pair of laterally spaced U-bolts carried by said body and adapted to engage said oppositely disposed side portions of said keeper, with each said U-bolt having a base connected to spaced apart depending legs with said U-bolts extending substantially parallel to said cable receiving groove and adapted to move said keeper to said closed position with said U-bolts remaining parallel to said cable receiving groove in all positions of said U-bolts,
   (c) there being laterally spaced pairs of openings through said body receiving the legs of said U-bolts with the outermost sides of one pair of said spaced apart openings extending downwardly and inwardly in position to receive the legs of one U-bolt with a loose fit and permit free outward tilting movement thereof,
   (d) a spring interposed between a portion of the laterally extending side portion of said keeper located intermediate the legs of the other U-bolt and the adjacent side of said body intermediate the legs of said other U-bolt for urging said keeper toward said open position, and
   (e) a projection carried by said adjacent side of said body in position to receive the adjacent end of said spring and there being a recess in the adjacent side portion of said keeper in position to receive the other end of said spring.

2. A cable clamp as defined in claim 1 in which an upwardly extending element is carried by the side portion of said keeper which is above said downwardly and inwardly extending openings with said element being outwardly of said groove to limit outward movement of said one U-bolt while in its groove.

* * * * *

REEXAMINATION CERTIFICATE (1479th)
United States Patent [19]
Hall

[11] B1 4,383,668

[45] Certificate Issued Jun. 4, 1991

[54] CABLE CLAMP

[76] Inventor: Gaddis G. Hall, P.O. Box 6699, Birmingham, Ala. 35210

Reexamination Request:
No. 90/002,142, Sep. 20, 1990

Reexamination Certificate for:
Patent No.: 4,383,668
Issued: May 17, 1983
Appl. No.: 270,255
Filed: Jun. 4, 1981

[51] Int. Cl.$^5$ ............ E21F 17/02; F16L 3/00
[52] U.S. Cl. .................... 248/63; 24/135 L; 174/42; 339/804
[58] Field of Search ............ 248/63, 64, 74.1, 544, 248/689; 403/346, 347, 373, 188; 24/135 L, 136 B, 135 R, 135 N, 263 A; 174/40 R, 94 S, 42; 339/804

[56] References Cited

U.S. PATENT DOCUMENTS

| | | | |
|---|---|---|---|
| 2,041,613 | 5/1936 | Lincks | 248/65 X |
| 3,470,528 | 9/1969 | Farrington, Jr. et al. | 24/115 R X |
| 3,879,809 | 4/1975 | Lindsey | 24/135 L |

OTHER PUBLICATIONS

Bethea National Catalog (Index, p. A-18-Jun./19-74—p. A-19-Apr./1976).

*Primary Examiner*—Ramon O. Ramirez

[57] ABSTRACT

A cable clamp embodies a body having a cable receiving groove therein and a keeper mounted for movement to selected positions over the cable receiving groove. A resilient member between the body and the keeper urges the keeper to a position which permits a cable to be inserted or removed. Clamping members are carried by the body in parallel relation to the groove, with one clamping member being connected to the body in a manner which permits it to be tilted and moved selectively to a released position and a connected position relative to side portions of the keeper adjacent thereto.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

Claim 2 is cancelled.

New claims 3 and 4 are added and determined to be patentable.

*3. A cable clamp as defined in claim 1 in which an upwardly extending element is carried by the side portion of said keeper which is above said downwardly and inwardly extending openings with said element being outwardly of a groove in said keeper to limit outward movement of said one U-bolt while in said groove.*

*4. In an improved clamp having a body with a cable receiving groove therein and a clevis at one end thereof for pivotal connection to a supporting structure and a pulling eye at the other end thereof, a keeper mounted for movement in a direction substantially perpendicular to said cable receiving groove selectively to an open position spaced from said cable receiving groove and to a closed position engaging a cable in said cable receiving groove, a first U-bolt carried by said body, said first U-bolt adapted to engage a first laterally extending side portion of said keeper and having a base connected to spaced apart depending legs with said depending legs received by said body in a pair of openings through said body spaced laterally from said cable receiving groove, a spring connected between a portion of said first laterally extending side portion of said keeper extending intermediate the legs of said U-bolt and the adjacent side of said body extending intermediate the legs of said first U-bolt for urging said keeper toward said open position; a projection carried by said adjacent side of said body in position to receive said spring and there being a recess in the adjacent side portion of said keeper in position to also receive said spring, the improvement comprising: a second U-bolt carried by said body, said second U-bolt having a base connected to spaced apart depending legs with said legs received in a pair of openings in said body laterally spaced from said cable receiving groove with the outer most sides of said openings extending downwardly and inwardly in position to receive the legs of said second U-bolt with a loose fit and permit free outward tilting movement thereof, said second U-bolt engaging a second laterally extending side portion of said keeper disposed opposite of said first laterally extending side portion thereof, with said first and second U-bolts extending substantially parallel to said cable receiving groove and adapted to move said keeper to said closed position with said first and second U-bolt remaining parallel to said cable receiving groove in all positions of said U-bolts.*

* * * * *